(12) United States Patent
Mulder et al.

(10) Patent No.: US 12,597,874 B2
(45) Date of Patent: Apr. 7, 2026

(54) MULTI-TURN LIMITING DEVICE AND METHOD OF LIMITING THE MOVEMENT OF A MOTOR DRIVEN ELEMENT

(71) Applicant: RIDDER DRIVE SYSTEMS B.V., Harderwijk (NL)

(72) Inventors: Steven Mulder, Harderwijk (NL); Vincentius Adrianus Franciscus Hoveling, Harderwijk (NL)

(73) Assignee: RIDDER DRIVE SYSTEMS B.V., Harderwijk (NL)

( * ) Notice: Subject to any disclaimer, the term of this patent is extended or adjusted under 35 U.S.C. 154(b) by 521 days.

(21) Appl. No.: 17/792,311

(22) PCT Filed: Jan. 19, 2021

(86) PCT No.: PCT/NL2021/050032
§ 371 (c)(1),
(2) Date: Jul. 12, 2022

(87) PCT Pub. No.: WO2021/150106
PCT Pub. Date: Jul. 29, 2021

(65) Prior Publication Data
US 2023/0055074 A1     Feb. 23, 2023

(30) Foreign Application Priority Data
Jan. 20, 2020    (NL) ..................................... 2024705

(51) Int. Cl.
*H02K 11/21*          (2016.01)
*E05F 15/40*          (2015.01)
(Continued)

(52) U.S. Cl.
CPC .............. *H02P 27/06* (2013.01); *E05F 15/40* (2015.01); *E05F 15/619* (2015.01);
(Continued)

(58) Field of Classification Search
CPC ......... H02P 27/06; H02P 6/16; G05B 19/409; G05B 2219/36464; E05F 15/619
See application file for complete search history.

(56) References Cited

U.S. PATENT DOCUMENTS

| | | | |
|---|---|---|---|
| 2006/0006734 A1* | 1/2006 | Tabata | ................ B60W 10/101 |
| | | | 303/3 |
| 2008/0005913 A1 | 1/2008 | Kachouh | |

(Continued)

FOREIGN PATENT DOCUMENTS

| | | |
|---|---|---|
| EP | 1710640 A1 | 10/2006 |
| EP | 2873945 A1 | 5/2015 |

OTHER PUBLICATIONS

International Search Report and Written Opinion for PCT/NL2021/0500332 dated Apr. 14, 2021 (16 pages).

*Primary Examiner* — Mohammad Ali
*Assistant Examiner* — Vincent W Chang
(74) *Attorney, Agent, or Firm* — KDW Firm PLLC

(57)          ABSTRACT

A multi-turn limiting device for limiting movement of an element driven by a motor includes a sensor configured to provide a sensor signal corresponding to a position of the element, a movable member mechanically couplable to the element via a transmission having a non-unitary first transmission ratio and a further sensor configured to provide a further sensor signal corresponding to the position of the movable member. A controller switches the motor via a switching signal determined on the basis of the two sensors. A method of limiting movement of an element driven by a motor includes sensing the position of the element using two sensors and a movable member which is coupled to the element via a non-unitary transmission ratio.

14 Claims, 3 Drawing Sheets

Figure 1:
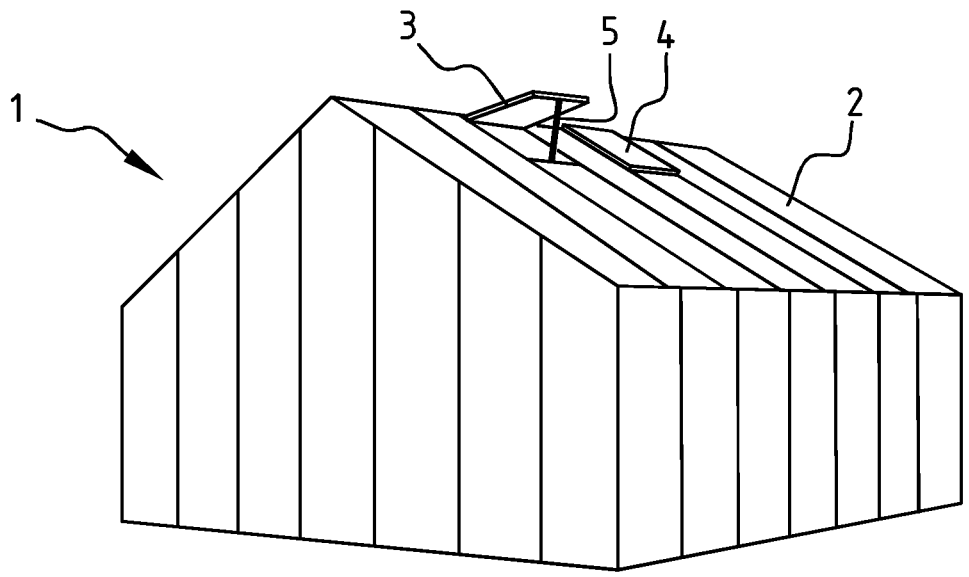

(51) Int. Cl.

| | |
|---|---|
| *E05F 15/619* | (2015.01) |
| *G05B 19/409* | (2006.01) |
| *G05B 19/425* | (2006.01) |
| *H02P 6/16* | (2016.01) |
| *H02P 27/06* | (2006.01) |

(52) U.S. Cl.
CPC ......... *G05B 19/409* (2013.01); *G05B 19/425* (2013.01); *H02K 11/21* (2016.01); *H02P 6/16* (2013.01); *E05Y 2201/722* (2013.01); *E05Y 2400/32* (2013.01); *E05Y 2900/152* (2013.01); *G05B 2219/33192* (2013.01); *G05B 2219/36463* (2013.01); *G05B 2219/36464* (2013.01); *G05B 2219/36465* (2013.01); *G05B 2219/45242* (2013.01)

(56) References Cited

U.S. PATENT DOCUMENTS

| | | | |
|---|---|---|---|
| 2009/0231019 A1* | 9/2009 | Yeh ........................ | G06F 3/0233 |
| | | | 327/509 |
| 2009/0234540 A1 | 9/2009 | Collet et al. | |
| 2010/0194385 A1 | 8/2010 | Ronnat et al. | |
| 2011/0026040 A1* | 2/2011 | Makiuchi ................ | G01B 7/30 |
| | | | 356/614 |
| 2017/0284828 A1 | 10/2017 | Rodger et al. | |
| 2020/0232817 A1* | 7/2020 | Kichise ................... | G01D 5/04 |

\* cited by examiner

MULTI-TURN LIMITING DEVICE AND METHOD OF LIMITING THE MOVEMENT OF A MOTOR DRIVEN ELEMENT

This application is a national stage filing under 35 U.S.C. 371 of pending International Application No. PCT/NL2021/050032, filed Jan. 19, 2021, which claims priority to Netherlands Patent Application No. 2024705, filed Jan. 20, 2020, the entirety of which applications are incorporated by reference herein.

The invention relates to a multi-turn limiting device for limiting movement of an element driven by a motor, the limiting device comprising a memory configured to store a value corresponding to a limit position of the element, a sensor configured to provide a sensor signal corresponding to a position of the element, an output for providing a switching signal to the motor, and a controller connected to the sensor for receiving the sensor signal and to the memory for retrieving the value and to the output for providing the switching signal, wherein the controller is configured to provide the switching signal depending on the sensor signal and the value.

Multi-turn limiting devices have various applications, some of those being found in the cultivation sector. In particular, limiting devices are applied in greenhouses. Greenhouses generally have a series of windows that can be opened and closed by driving them using a motor. It is customary to drive multiple windows using a single motor, which must therefore offer a relatively large amount of torque. For that purpose, a transmission is provided allowing the motor to turn a relatively large number of times within the movement range, i.e. a swing, of the windows. In order to prevent damage to the windows, the drive system, or other parts of the greenhouse, the motor must be stopped when the window is fully open or fully closed. Of course the multi-turn limiting device can be used to limit the movement of other components. In particular, they may be used for greenhouse screens.

A multi-turn limiting device limits the movement of an element (e.g. an axle driving the window in the example at hand), even if the axle needs to rotate multiple times within the allowed ranged of motion of the element, by tracking the position of the axle during multiple rotations. In order to stop the element from moving, the position of the element is compared to a limit position which is stored in memory, and a switching signal is provided to a motor driving the element. The switching signal can be the motor current, or could be a digital or analogue input to a motor driver.

To distinguish between two different positions within the allowed range of motion for a multi-turn application, it is generally sufficient to continuously track the position of the element, as accordingly the amount of rotations could be counted and stored. However, after a temporary power outage, limiting devices using this method can not determine whether and how much the element has moved during the power outage, for they are unable to distinguish between positions of the element separated by an integer amount of turns. They are therefore considered unsafe. A solution to this problem was proposed by Lock Antriebstechniek GmbH in EP 3 249 767 A2. The solution presented therein is to employ either a battery, or a sensor that supplies its own energy, for instance via magnetic induction of the moving element.

The limiting device of EP 3 249 767 A2 does however have disadvantages. For one, the battery might run out and has a rather limited lifetime. Moreover, sensors employing the magnetic induction of the element they are sensing, such as a Wigand sensor, are relatively complex and may therefore be relatively expensive, and sometimes use proprietary designs.

It is therefore an object of the invention to provide a multi-turn limiting device that is less complex and/or does not rely on a battery and/or has an extended lifetime.

According to the invention, said object is achieved by a multi-turn limiting device according to the preamble, which is characterized in that it further comprises a movable member, the movable member being mechanically couplable to the element via a transmission having a non-unitary first transmission ratio, and a further sensor configured to provide a further sensor signal corresponding to the position of the movable member, wherein the controller is further connected to the further sensor for receiving the further sensor signal, and wherein the controller is configured to provide the at least one switching signal further depending on the further sensor signal.

Using a further sensor ultimately connected to the element via a non-unitary transmission ratio, allows sensing the position of the element over a multi-turn range with a relatively large accuracy. The principle of adding a second sensor is inspired by the Nonius principle (in some communities referred to as Vernier principle), and works as follows. By adding a further sensor with a non-unitary transmission ratio (i.e. a transmission ratio that does not equal 1), a difference in transmission ratio from element to sensor and from element to further sensor exists. Thus, for each movement of the element, the sensor and the further sensor move a different amount. By choosing suitable transmission ratios, a relatively large amount of unique combinations of readings from the sensor and the further sensor can be obtained across multiple turns of the element.

In general, it is also possible to transfer a multi-turn range into a single-turn range if a transmission with a relatively large transmission ratio is used. Using such a transmission allows to use a single position sensor for the element. However, due to the relatively large transmission ratio such a configuration introduces a rather high error margin. Since the limiting device according to the invention uses a combination of two transmission ratios, a similar range may be spanned by the unique combinations of readings of the sensors without requiring a relatively large transmission ratio. As such, the limiting device according to the invention may be more accurate.

The concept of the invention can be extended by using yet another movable member and yet another further sensor, of course at a different transmission ratio as the sensor and the further sensor. By selecting a suitable transmission ratio, accuracy or range may be increased as desired. Even more movable members and sensors can be added at different transmission ratios if desired.

The limiting device may comprise a processor configured to perform checks on the functioning of the controller. The processor may for instance be configured to verify the controller provides output or provides a specific output under certain conditions, and provide an error signal otherwise. The processor can be a distinct piece of hardware that is separate from the controller. However, the controller and the processor could be embodied as separate software modules running on one or more shared hardware components.

The sensor and optionally the further sensor may be an angular position sensor. Angular position sensors are available that can determine an angular position with sufficient accuracy. However by themselves, angular position sensors are unable to distinguish between angular positions separated by an integer amount of turns from each other. Using the movable member and the different transmission ratio, unique combinations of sensor readings can be created even across several turns of the element.

Advantageously, the sensor and optionally the further sensor is a hall-effect sensor. Such sensors are readily available and when used in the limiting device as described herein, may provide sufficient accuracy over a relatively large amount of turns.

In an embodiment of the limiting device, the limiting device comprises a second movable member, the second movable member being mechanically couplable to the element via a second transmission having a second transmission ratio, the second transmission ratio being different from the first transmission ratio, wherein the sensor is configured to provide the sensor signal depending on the position of the second movable member.

Introducing a second movable member allows introducing a second transmission. By introducing a second transmission, the transmission and the second transmission can be adjusted to each other in order to create a relatively large amount of unique combinations of sensor readings, thereby spanning a relatively large range of movement at relatively high accuracy. Using two separate and different transmissions for the two sensors, allows selecting an appropriate difference in transmission ratio's without requiring one relatively large transmission ratio.

In another embodiment of the limiting device, the first transmission ratio expressed in integers is $$\frac{p_1}{q_1}$$

and the second transmission ratio expressed in integers is $$\frac{p_2}{q_2},$$

wherein $$\left(n\frac{p_1}{q_1}\right)\mathrm{mod}\,1 = \left(n\frac{p_2}{q_2}\right)\mathrm{mod}\,1$$

has no non-zero integer solutions for n below 25, preferably not below 40, more preferably not below 50, wherein preferably the lowest non-zero integer solution is n=57.

Having no non-zero integer solutions to the above-described equation below the respective thresholds guarantees a minimal amount of turns of the element between which the limiting device can distinguish. As such, when n=57, the limiting device can distinguish between positions scattered over 57 rotations of the element. Therefore, the position of e.g. a window can be determined uniquely as long as it requires 57 turns or less to completely open or close. The applicant has found that n=57 is advantageous for some greenhouse applications, as it allows sufficient range and accuracy at the same time. For other applications however, it is possible to use a lowest non-zero integer solution of n=207, or even higher. The transmission ratios can be selected in order to arrive at a desired lowest integer solution for n.

Alternatively or additionally, it is possible to choose different transmission ratio's, i.e $$\frac{p_1}{q_1} \ne \frac{p_2}{q_2}.$$

in practice this would lead to n>1. In general, it is advantageous to choose at least one of $p_1$ and $q_1$ and/or at least one of $p_2$ and $q_2$ respectively as prime. This aids in achieving unique transmission ratios, preferably with a relatively large smallest common multiple, e.g. one equal to their product.

In yet another embodiment of the limiting device, the controller is configured to compare the sensor signal and the further signal, and to provide an error signal based on said comparison.

Since the sensors are both coupled to the element, changes in the sensor signal are related to changes in the further sensor signal and vice versa. Accordingly, by comparing the sensor signal to the further sensor signal, it becomes possible to confirm both sensors are operating as expected. If not, an error signal can be given, so that e.g. an operator can service the limiting device. It is also possible to switch the switching signal so as to turn of the motor based on the comparison, to prevent moving the element during maloperation of the limiting device. This increases the robustness of the limiting device.

In yet another embodiment of the limiting device, the limiting device further comprises a movable engaging member for engaging the element, the engaging member being mechanically coupled to at least the movable member and optionally to the further movable member.

The engaging member may transfer a movement of the element to the movable element and optionally to the second movable element. The engaging member may be provided with a spline for engaging the element. Of course, other methods of transferring movement from the element to the engaging member may be employed.

In yet another embodiment of the limiting device at least one of the following comprises cogs: the movable member, the second movable member, and the engaging member.

Using cogs a reliable transmission may obtained. Further, using cogs allows the sensor and/or the further sensor to provide a signal corresponding to the position of a component fixed directly to the cog, such as an axle. This allows for a relatively simple design.

In particular, the engaging member may be provided with two sets of cogs of which the amount of cogs differs mutually.

Using two sets of cogs with a different amount of cogs (the protrusions or teeth on a cogwheel) allows to connect the two (or more) sensors via the engaging member to the element, whilst at the same time aiding in providing a difference in transmission ratio via the differing number of cogs.

Additionally or alternatively, the movable member and the second movable member may both be provided with a set of cogs of which the amount of cogs differs mutually.

The movable members may be provided with cogs in order to couple to the engaging member. By employing a different amount of cogs for each movable member, a difference in transmission ratio can be obtained or enlarged.

In particular if both the engaging member and the movable members are provided with sets of cogs, a particularly large difference in transmission ratio can be obtained, which may allow selecting a desired difference in transmission ratio.

In yet another embodiment of the limiting device, the limiting device further comprises a housing, wherein at least the controller, the sensor, the movable member, and the further sensor are housed in the housing, the output being provided to the exterior of the housing.

Placing said components in a housing allows using the limiting device as a stand-alone device that may be placed near a motor driven element, without necessarily having to be close to or integrated with the motor. This may make the limiting device more versatile. Additionally, the housing may protect the components from circumstances occuring in greenhouses, such as relatively high humidity and temperatures. The output, e.g. an electric or electronic output, can be used to connect a motor to the limiting device, for instance at a distance of the limiting device.

The controller, the sensor, the movable member, and the further sensor may be housed in a single housing.

The housing may be placed into, or integrated with, a gearbox for driving the element by the motor.

The controller may further be configured to provide a position signal at the output, the position signal corresponding to the position of the element. The position signal can be used by external control means, such as a climate computer, control the motor depending on the position of the element, thereby essentially creating a feedback loop.

This is vastly different from the prior art, where it is customary to run a motor for a predefined period of time in order to partly open or close a window. The predetermined period of time is calculated as a fraction of the total time needed to move the component between two limit positions, e.g. the time needed to completely open and/or close windows or screens. The total time needed is usually determined on a daily basis by moving the component back and forth at least once between the limit positions. Depending on the components involved, this can take anywhere between 3-15 min.

By using the position signal of the limiting device for controlling the motor, more accurate control is possible. Moreover, it is no longer necessary to move the component between the limit positions once daily. As such, using the position signal allows placing the components in an optimal or desired position longer and more accurately. In e.g. a greenhouse, this may enhance growing conditions.

It is noted that it is principally possible to use the position signal as part of a control loop also for determining the limit positions. However, it is still of vital importance the limiting device provides the switching signal separate from the position signal as a matter of safety. In particular, using the switching signal allows the limiting device to switch the motor, so that e.g. a climate computer operating based on the position signal is not critical for the safety.

The controller may be further configured to provide a second switching signal based on a comparison between the sensor signal and the further sensor signal on the one hand, and an intermediate position stored in the memory. Accordingly, the limiting device can be used to provide a switching signal for supplementary devices needing switching at intermediate positions, such as fans. Moreover, the second switching signal can be used near the limit positions in order to remove the speed of the motor driving the element. It is of course possible to provide several distinct second switching signals.

The second switching signal and/or the position signal may be provided at the output.

The housing may define an infeed for an axle, the axle being the element driven by the motor.

By providing an infeed, the limiting device may be coupled to the axle. At the same time, the housing can protect the interface between the element from external influences when an infeed is used. The infeed may be a through-hole or a blind hole.

The invention also relates to an assembly of a multi-turn limiting device according to the previous claim and an element that is drivable by a motor, the limiting device engaging the element with the engaging member for mechanically coupling at least the movable member and optionally the further movable member to the element, wherein optionally the assembly further comprises a motor connected to the element for driving it.

The assembly may comprise the limiting device as described above, with any above-described features, alone or in any suitable combination.

The invention also relates to a method of limiting the movement of an element driven by a motor, the method comprising sensing a position of the element, sensing a position of a movable member which is mechanically coupled to the element via a transmission having a non-unitary first transmission ratio, comparing the sensed positions with a predefined limit position and switching the motor based on said comparison.

By sensing the positon of the element and of the movable element, a unique combination of positions can be measured across multiple turns of the element relatively accurately.

Sensing the position of the element may comprise sensing a position of a second movable member which is mechanically coupled to the element via a second transmission ratio different from the first transmission ratio.

Using a second movable member allows introducing a second transmission ratio, which in turn allows choosing transmission ratios creating a greater number of unique position combinations.

The controller may be communicatively connected to wireless communication means, and may be configured to:
in reaction to a first instruction, received by the wireless communication means, store the measured position based on the sensor signal in the memory as said limit position.

Figure 2:
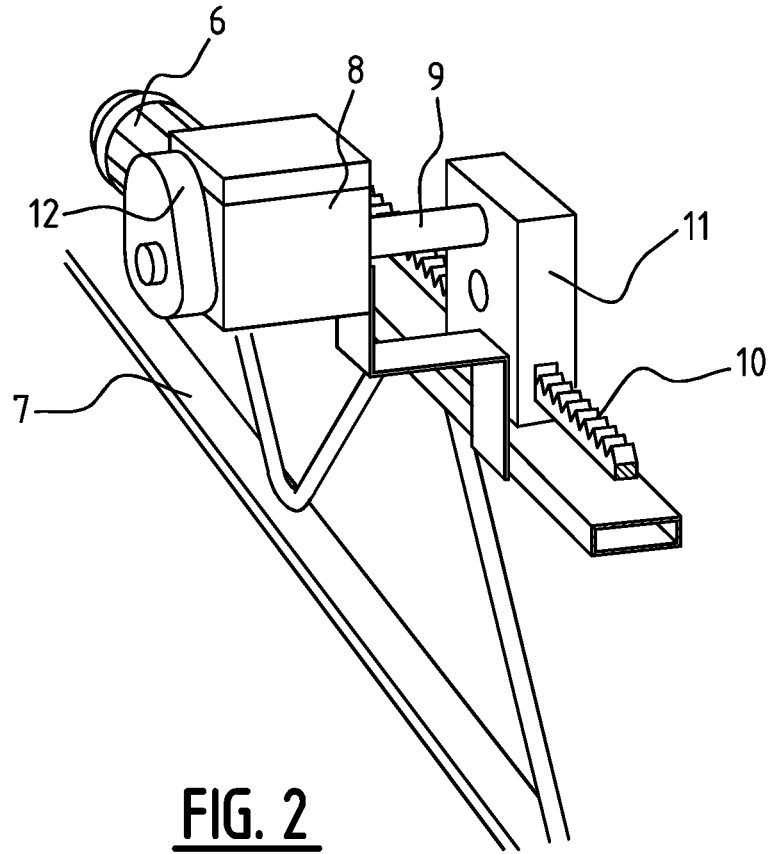
Figures 3, 4:
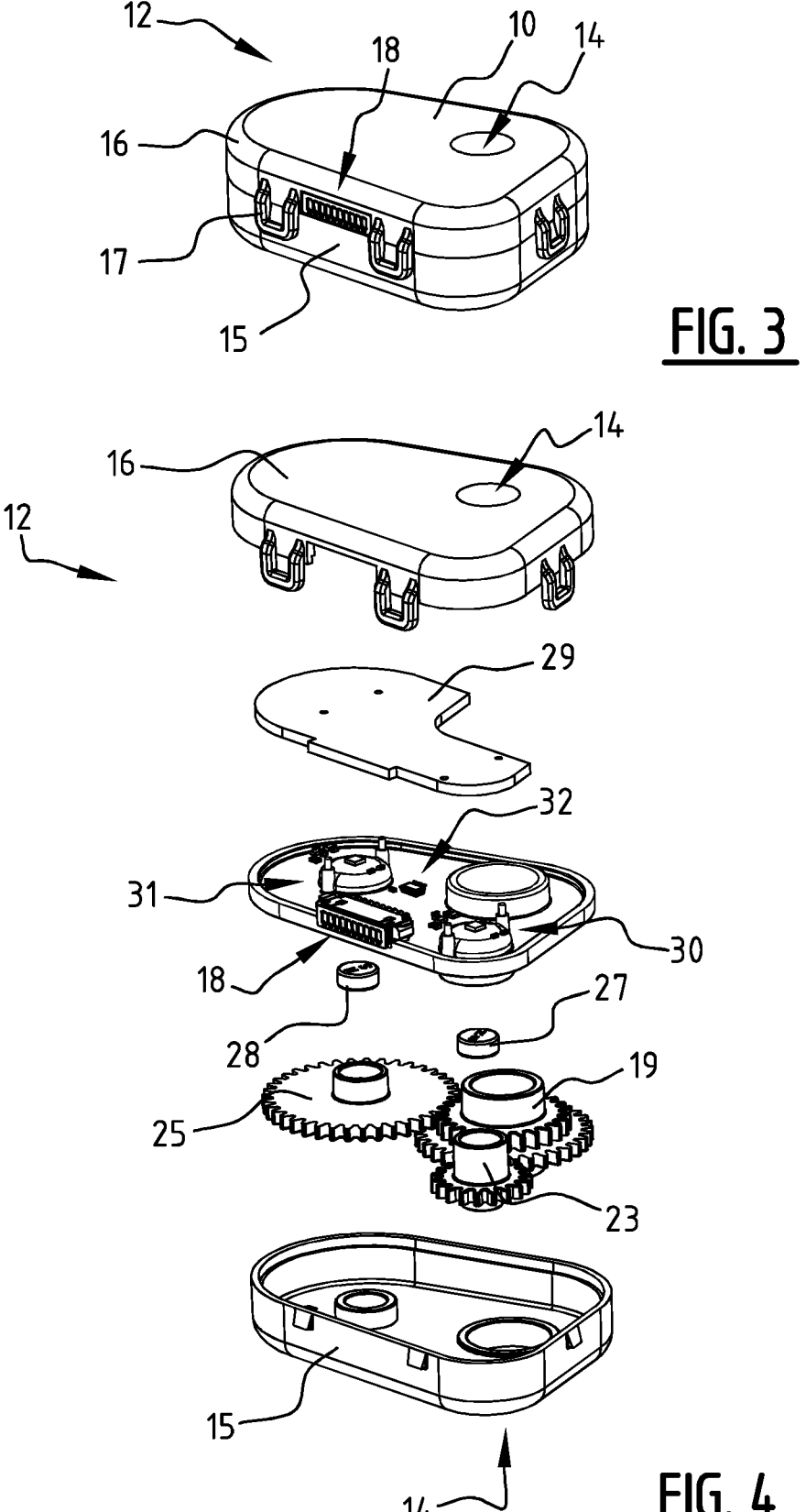
Figure 5:
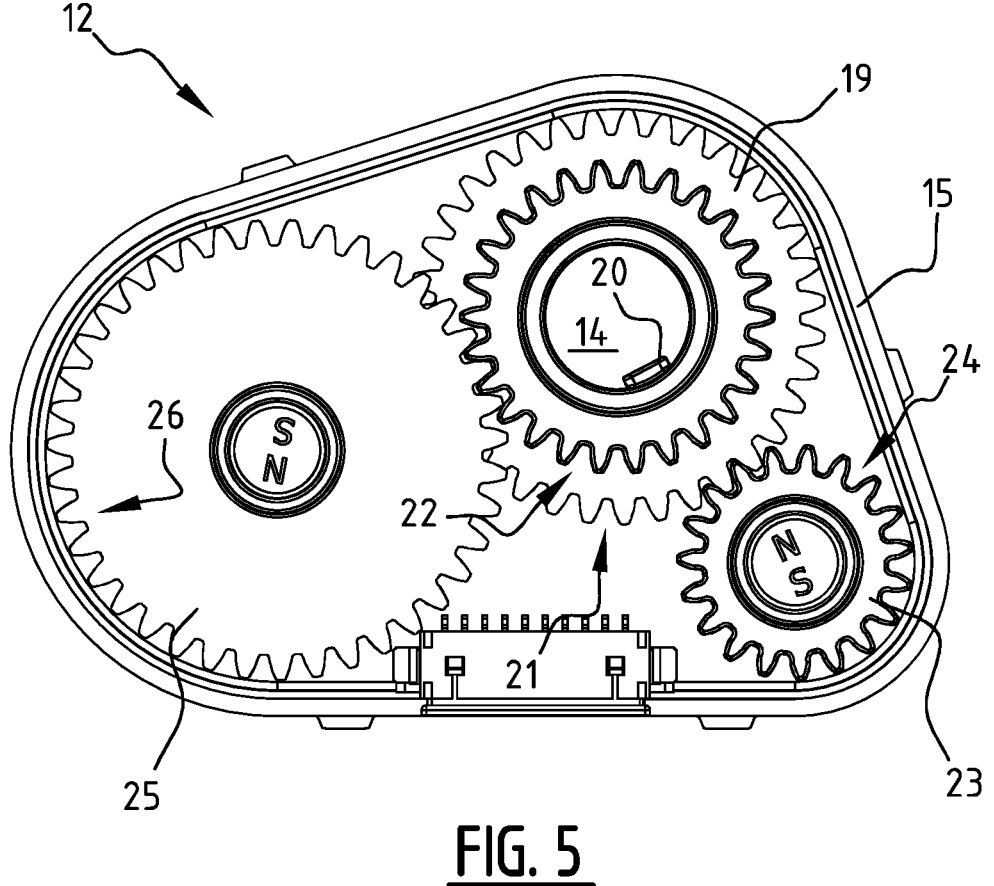

The invention will be further elucidated with reference to the attached figures, in which:

FIG. 1 schematically shows a perspective view of a greenhouse;

FIG. 2 schematically shows a perspective view of a motor driving an element;

FIG. 3 schematically shows a perspective view of a multi-turn limiting device;

FIG. 4 schematically shows an exploded view of the limiting device of FIG. 3; and FIG. 5 schematically shows a top view of the inside of the limiting device of FIGS. 3 and 4.

Throughout the figures, like elements will be referred to using like reference numerals.

FIG. 1 shows a greenhouse 1 which has transparent walls and a transparent roof 2. The greenhouse 1 shown has an opened window 3 and a closed window 4. Both windows 3, 4 can be hinged open or closed by moving a rod 5 from within the greenhouse 1. In practice, greenhouses have many more windows 3, 4, and series of windows are operated simultaneously by driving their respective rods 5.

The driving force usually comes from an electric motor 6 (see FIG. 2) mounted on a frame 7 within the greenhouse 1. In this example, the electric motor 6 feeds a gearbox 8 in order to rotate a shaft 9. The shaft 9 transfers force to all windows 3, 4 driven by the motor 6. As an example, the shaft 9 is shown connect to a pinion 10 via a rack (not shown) placed inside a mounting box 11. The pinion 10 may be directly connected to the rod 5 for opening a window 3, 4. As such, it can be seen that rotation of the shaft 9 controls movement of the window 3, 4. In order to prevent damage to the windows 3, 4, the motor 6, the greenhouse 1 or other elements therein/thereof, the movement of the windows 3, 4 must be limited to their allowed range of motion, i.e. to anywhere between their fully closed and fully opened position. As rotation of the shaft 9 defines movement of the windows 3, 4, the movement of the windows 3, 4 can principally be limited by limiting movement of the shaft 9 to within a range that corresponds to an allowed range of motion of the windows 3, 4.

In order to do so, a limiting device 12 is connected to the shaft 9. The limiting device 12 provides a switching signal to the motor 6. The motor 6 responds to the limiting signal by driving the shaft 9 in accordance with the switching signal. The switching signal may accordingly command the motor 6 to drive the shaft in a particular direction, and/or to stop rotation. In practice, the switching signal is simply the motor current, however another analog or digital switching signal could also be used.

In order to fully open or close the window 3, 4, the shaft 9 must rotate multiple times. As such, within the range of motion of the window 3, 4, the shaft 9 has the same angular position several times. Thus it is impossible to uniquely determine the position of the window 3, 4 from the angular position of the shaft 9 by itself. Therefore, multi-turn limiting devices exist that track rotation of the shaft 9 and determine the position of the windows 3, 4 accordingly.

The limiting device 12 as described herein is such a multi-turn limiting device 12, as it allows distinguishing between several positions of the element across multiple turns thereof. The multi-turn limiting device 12 will be described in further detail below with reference to FIGS. 3-5, without further reference to the windows 3, 4, shaft 9 or greenhouse 1, because the invention can also be applied for limiting the movement of greenhouse screens, but also for limiting other components actuated by an element which rotates more than one full turn within the range of motion of the component.

The multi-turn limiting device 12 comprises a housing 15, 16 with a feed-through 14 for an axle. The housing 15, 16 consists of a bottom part 15 and a top part 16, which are mounted to each other using snap connectors 17. On the exterior of the housing 15, 16, an output 18 is provided in the form of several electric connectors. By attaching wires to the electric connectors of the output 18, signals provided by the multi-turn limiting device 12 can be used elsewhere.

In FIGS. 4 and 5, it can be seen that the multi-turn limiting device includes an engagement member 19 which has a through-hole lining up with the feed-through 14. The engagement member 19 has a spline 20, with which it can be connected to an axle. The spline 20 transfers rotational movement of the axle to the engagement member 19. The engagement member 19 has two different set of cogs 21, 22, which rotate together with each other and the spline 20.

The first set of cogs 21 is connected to a movable element 23 via a set of cogs 24 thereof. Accordingly, rotation of the engaging member 19 is transferred to the movable element 23 via a transmission ratio defined by the two interacting sets of cogs 21, 24. The second set of cogs 22 is connected to a second movable element 25 via a set of cogs 26 thereof. Accordingly, rotation of the engaging member 19 is transferred to the second movable element 25 via a transmission ratio defined by the two interacting sets of cogs 22, 26.

Two permanent magnets 27, 28 are mounted in a receiving space of the movable elements 23, 25 respectively, so that they rotate with the movable elements 23, 25. The limiting device 12 further includes a printed circuit board 29, to which several components are attached. For the sake of clarity, the components of the printed circuit board 29 are shown separate form the board in FIG. 4. Among the components are two Hall-effect sensors 30, 31, which are configured for measuring the angular position of the movable element 23 and the second movable element 25 by means of the magnetic field caused by the permanent magnets 27, 28. Since the angular position of the movable elements 23, 25 is coupled to movement of the engaging member 19, and therefore can be coupled to the movement of the element driven by the motor, the Hall-effect sensors 30, 31 indirectly measure the angular position of the element. However, as the transmission from the element to the movable element 23, 25 is different for each sensor 30, 31, the sensor measurements are related, but not equal. The sensors 30, 31 are connected to a controller 32, which receives signals from the sensors 30, 31. The controller 32 provides a switching signal at the output 18. The controller has a built-in memory, however an external memory could also be used.

Every movement of the element causes a corresponding movement of the movable elements 23, 25. As long as a movement of the element does not result in an integer amount of rotations of both movable elements 23, 25, the combination of readings from the sensors 30, 31 is unique. Thus, said combinations are unique within a predetermined range. The range is determined by the number of turns of the element between two equal combinations of positions of both movable elements 23, 25. By selecting suitable transmission ratios, the range may be relatively wide. In the limiting device 12 shown in the figures, the engaging member has two sets of cogs, having 26 and 35 cogs respectively. The movable element 23 has 19 cogs and gears with the 35 cogs of the engaging member 19. The second movable element has 39 cogs and meshes with the 26 cogs of the engaging member 19.

Accordingly, for n rotations of the engaging member 19, the movable element 23 moves $$m_1 = n \cdot \frac{35}{19}$$

rotations, and the second movable element 25 moves $$m_2 = n \cdot \frac{26}{39}$$

rotations. When n=57, $m_1$=105 and $m_2$=38. No lower n exist for which both $m_1$ and $m_2$ are integers. As such, between 0 and 57 rotations of the engaging element, each combination of angular positions of the movable elements 23, 25 is unique. Of course, the engaging member 19 could be coupled to the element via a unitary transmission or some other transmission. Nevertheless, by using the two different transmissions to the sensors, the position of the engaging member 19, and therefore also the element, can be uniquely determined over a relatively large range.

Although the invention has been described hereabove with reference to a number of specific examples and embodiments, the invention is not limited thereto. Instead, the invention also covers the subject matter defined by the claims, which now follow.

The invention claimed is:

1. A multi-turn limiting device for limiting movement of an element driven by a motor, the limiting device comprising:

a memory configured to store a value corresponding to a limit position of the element;

an angular position sensor configured to provide a sensor signal corresponding to an angular position of the element;

an output for providing a switching signal to the motor, and a controller connected to the sensor for receiving the sensor signal and to the memory for retrieving the value and to the output for providing the switching signal, wherein the controller is configured to provide the switching signal by comparing the sensor signal with the value corresponding to the limit position;

wherein the multi-turn limiting device further comprises:

a movable member, the movable member being mechanically couplable to the element via a transmission having a non-unitary first transmission ratio; and a further angular position sensor configured to provide a further sensor signal corresponding to the angular position of the movable member, and wherein the controller is further connected to the further sensor for receiving the further sensor signal, and wherein the controller is configured to:

provide the at least one switching signal further depending on the further sensor signal; and provide a position signal to the output separate from the at least one switching signal, wherein the position signal corresponds to the position of the element over a multi-turn range; and wherein the limiting device further comprises a housing, at least the controller, the angular position sensor, the movable member, and the further angular position sensor are housed in the housing, the output being provided to the exterior of the housing.

2. The limiting device according to claim 1, wherein the angular position sensor and optionally the further angular position sensor is a hall-effect sensor.

3. The limiting device according to claim 1, comprising a second movable member, the second movable member being mechanically couplable to the element via a second transmission having a second transmission ratio, the second transmission ratio being different from the first transmission ratio, wherein the angular position sensor is configured to provide the sensor signal depending on the position of the second movable member.

4. The limiting device according to claim 3, wherein the first transmission ratio is $r_1$ and the second transmission ratio is $r_2$, wherein $r_1$ and $r_2$ are rational numbers, wherein $(n*r_1)$ mod $1=(n*r_2)$ mod 1 has no non-zero integer solutions for n below 25, wherein n represents the number of rotations of the element.

5. The limiting device according to claim 3, wherein the first transmission ratio is $r_1$ and the second transmission ratio is $r_2$, wherein $r_1$ and $r_2$ are rational numbers, wherein $(n*r_1)$ mod $1=(n*r_2)$ mod 1 has no non-zero integer solutions for n below 40, wherein n represents the number of rotations of the element.

6. The limiting device according to claim 3, wherein the first transmission ratio is $r_1$ and the second transmission ratio is $r_2$, wherein $r_1$ and $r_2$ are rational numbers, wherein $(n*r_1)$ mod $1=(n*r_2)$ mod 1 has no non-zero integer solutions for n below 50, wherein n represents the number of rotations of the element.

7. The limiting device according to claim 3, wherein the first transmission ratio is $r_1$ and the second transmission ratio is $r_2$, wherein $r_1$ and $r_2$ are rational numbers, wherein $(n*r_1)$ mod $1=(n*r_2)$ mod 1, and wherein the lowest non-zero integer solution is $n=57$, wherein n represents the number of rotations of the element.

8. The limiting device according to claim 1, wherein the controller is configured to compare the sensor signal and the further signal, and to provide an error signal based on said comparison.

9. The limiting device according to claim 1, comprising a movable engaging member for engaging the element, the movable engaging member being mechanically coupled to at least the movable member and optionally to a further movable member.

10. The limiting device according to claim 1, wherein at least one of the following comprises cogs: the movable member, a second movable member, and an engaging member.

11. The limiting device according to claim 10, wherein the engaging member is provided with two sets of cogs of which the amount of cogs differs mutually.

12. The limiting device according to claim 10, wherein the movable member and the second movable member are both provided with a set of cogs of which the amount of cogs differs mutually.

13. The limiting device according to claim 1, the housing defining an infeed for an axle, the axle being the element driven by the motor.

14. An assembly of a multi-turn limiting device according to claim 1 and the element that is drivable by the motor, the limiting device engaging the element with the engaging member for mechanically coupling at least the movable member and optionally a further movable member to the element, wherein optionally the assembly further comprises a motor connected to the element for driving the element.

* * * * *